(12) United States Patent
Neufeld et al.

(10) Patent No.: US 8,447,942 B2
(45) Date of Patent: May 21, 2013

(54) CONTENT STORAGE USING QUOTAS

(75) Inventors: Nadav M Neufeld, Sunnyvale, CA (US);
Joseph J Seidel, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 1038 days.

(21) Appl. No.: 12/136,030

(22) Filed: Jun. 9, 2008

(65) Prior Publication Data
US 2009/0304362 A1 Dec. 10, 2009

(51) Int. Cl.
*G06F 13/00* (2006.01)
(52) U.S. Cl.
USPC .......................................................... 711/163
(58) Field of Classification Search
None
See application file for complete search history.

(56) References Cited

U.S. PATENT DOCUMENTS

| 7,017,016 | B2 | 3/2006 | Chujo et al. | |
|---|---|---|---|---|
| 7,716,275 | B1 * | 5/2010 | Nagaralu et al. | 709/203 |
| 2003/0154485 | A1 | 8/2003 | Johnson et al. | |
| 2003/0237085 | A1 | 12/2003 | Boston et al. | |
| 2004/0006698 | A1 | 1/2004 | Apfelbaum | |
| 2004/0244030 | A1 | 12/2004 | Boyce et al. | |
| 2005/0066134 | A1 | 3/2005 | Tormasov et al. | |
| 2005/0193023 | A1 | 9/2005 | Ismail | |
| 2006/0041587 | A1 | 2/2006 | Grubbs et al. | |
| 2006/0130094 | A1 | 6/2006 | Lockridge | |
| 2007/0283385 | A1 * | 12/2007 | Qiu et al. | 725/34 |
| 2008/0263610 | A1 * | 10/2008 | Murray et al. | 725/110 |

OTHER PUBLICATIONS

Kemp,"Limiting Your Users Use of Disk Space with Quotas", 2004-2007, Pink Pony Productions, pp. 5.
Sharma, "Implementing Quotas to Restrict Disk Space Usage", Sep. 11, 2007, SourceForge, Inc., pp. 7.
"How to Enable Disk Quotas in Windows 2000", retrieved at <<http://support.microsoft.com/kb/183322>>, Microsoft, 2008, pp. 2.
"Disk Quotas", Copyright 1997-2004, Charles M. Kozierok, pp. 3.

* cited by examiner

*Primary Examiner* — Brandon Hoffman
(74) *Attorney, Agent, or Firm* — Wolfe-SBMC (57) ABSTRACT

Content storage using quotas as described. In an implementation, an apparatus comprises memory to store content obtained via a network connection and one or more modules to manage storage of the content using one or more quotas. A first one of the quotas specifies a maximum amount of the memory that is permitted to be used to store the content for a first user and a second one of the quotas specifies a maximum amount of the memory that is permitted to be used to store the content for a second user.

20 Claims, 5 Drawing Sheets

402
Output a user interface that is configured to receive one or more inputs to define a quota that specifies a maximum amount of storage space in memory that is to be used to store content having a particular characteristic

404
Receive inputs via the user interface that a define a quota based on one or more users

406
Receive inputs via the user interface that a define a quota based on metadata associated with the content

408
Manage storage of content using one or more quotas, in which, each quota specifies a maximum amount of memory that is permitted to be used to store content having a particular characteristic

410
Dynamically adjust the quotas based on monitored interaction with the content

CONTENT STORAGE USING QUOTAS

BACKGROUND

Users traditionally used removable storage media to record content for later playback. For example, users may have used videocassette recorders to record television programming, cassette tapes to record music, and so on. In these traditional techniques, the user was manually involved in recording the content. For instance, the user could select a new video cassette tape on which to record a television program or choose to record over a television program that is already stored on the videocassette tape.

Advances were subsequently made in how content could be stored, such as by the development of the personal video recorder (PVR), digital music devices, and so on. In the example of the PVR, for instance, modes may be provided in which content was recorded automatically based on preferences of the users. However, these modes may act to fill the storage space available in the PVR. Further, the storage space of the PVR may be filled even quicker when multiple users share a single PVR, such as typically encountered in a household.

SUMMARY

Content storage using quotas as described. In an implementation, an apparatus comprises memory to store content obtained via a network connection and one or more modules to manage storage of the content using one or more quotas. A first one of the quotas specifies a maximum amount of the memory that is permitted to be used to store the content for a first user and a second one of the quotas specifies a maximum amount of the memory that is permitted to be used to store the content for a second user.

In an implementation, an apparatus comprises memory to store content obtained via a network connection and one or more modules to manage storage of the content using one or more quotas. At least one of the quotas specifies a maximum amount of memory that is permitted to be used to store the content having a particular genre.

In an implementation, a user interfaces is output that is configured to receive one or more inputs to define a quota that specifies a maximum amount of storage space in memory that is to be used to store television programming having a particular characteristic. Storage of the television programming is managed using the quota.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

With the advent of personal video recorders, digital music players, and so on, users are provided with a variety of clients that may use techniques to store and play back content. However, the amount of storage space consumed by content is ever increasing, an example of which is the change from standard definition television programming to high definition television programming. Accordingly, the storage space available on the clients may be quickly consumed, thereby limiting the amount of storage space that is available to users to store additional content. Additionally, the clients may be shared by multiple users, which may further exacerbate this problem.

Content storage using quotas is described. In an implementation, management of storage space available on an apparatus (e.g., a personal video recorder, a digital music player, and so on) is managed using one or more quotas. The quotas may be defined to correspond to a variety of different characteristics, which may include characteristics of content to be recorded and/or a user that requested recordation of the content. For example, quotas may be assigned to individual members of a household, such that a maximum amount of storage space is allotted to each of the members. In another example, the quotas are defined to correspond to metadata associated with the content, such as genre, author, actors, and so on.

In the following discussion, an example environment and systems are first described that are operable to perform techniques to manage content using one or more quotas. Example procedures are then described that may be employed in the example environment, as well as in other environments. Although content selection and output is described in a television environment in the following discussion, it should be readily apparent that a wide variety of environments may be utilized without departing from the spirit and scope thereof, such as by digital music players.

Example Environment

Figure 1:
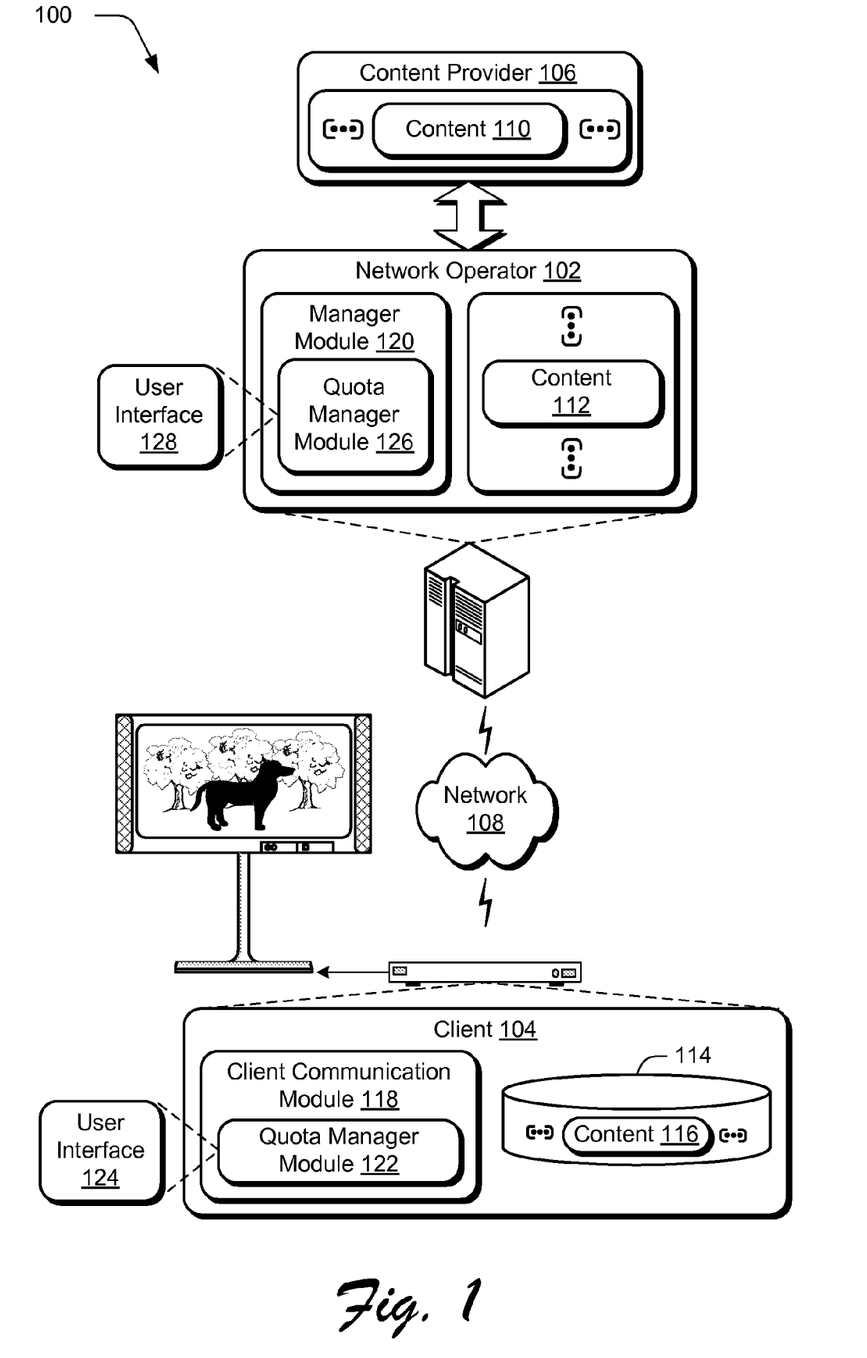
FIG. 1 is an illustration of an environment in an example implementation that is operable to employ techniques to manage content storage using quotas.

FIG. 1 is an illustration of an environment 100 in an example implementation that is operable to employ techniques to manage quotas. The illustrated environment 100 includes a network operator 102 (e.g., a "head end"), a client 104 and a content provider 106. The network operator 102 and the client 104 are illustrated as being communicatively coupled, one to another, via a network 108.

Although a single network 108 is shown, the network 108 may be representative of a plurality of network connections that may be achieved using a single network or multiple networks, e.g., network 108 may be implemented via the Internet, a cable network, an "over the air" broadcast network, and so on. In the following discussion, the network operator 102, the client 104 and the content provider 106 may also be representative of one or more entities, and therefore by convention reference may be made to a single entity (e.g., the client 104) or multiple entities (e.g., the clients 104, the plurality of clients 104, and so on).

The client 104 may be configured in a variety of ways. For example, the client 104 may be configured as a computer that is capable of communicating and/or receiving communications of data over the network 108, such as a television and set-top box as illustrated for client 104, a mobile station, an entertainment appliance (e.g., a game console), a set-top box communicatively coupled to a display device as illustrated, a wireless phone, a digital music player, and so forth. Thus, the clients 104 may range from full resource devices with substantial memory and processor resources (e.g., television-enabled personal computers, television recorders equipped with hard disk) to a low-resource device with limited memory and/or processing resources (e.g., traditional set-top boxes).

Communication of content to the client 104 may be performed in a variety of ways. For example, the client 104 may be communicatively coupled to the content provider 106 (which may be representative of one or more content providers) using a packet-switched network, e.g., the Internet. Accordingly, the client 104 may receive one or more items of content 110 directly from the content provider 106, e.g., via one or more websites. The content 110 may include a variety of data, such as television programming, video-on-demand (VOD) files, one or more results of remote application processing, digital music files, and so on. A variety of other examples are also contemplated, such as by using an indirect distribution example in which the content 110 is communicated over the network 108 to the network operator 102.

Content 110, as illustrated in FIG. 1, is communicated to the network operator 102 (e.g., via a network connection and/or computer-readable media) and may be stored as one or more items of content 112. The content 112 may be the same as or different from the content 110 received from the content provider 106. The content 112, for instance, may include additional data for broadcast to the client 104. For example, the content 112 may include electronic program guide (EPG) data from an EPG database for broadcast to the client 104 utilizing a carousel file system and an out-of-band (OOB) channel. Distribution from the network operator 102 to the client 104 over network 108 may be accommodated in a number of ways, including cable, radio frequency (RF), microwave, digital subscriber line (DSL), and satellite using a variety of networks as previously described for network 108.

The client 104, as previously stated, may be configured in a variety of ways to receive the content 112 via the network 108. The client 104 typically include hardware and software to transport and decrypt content 112 received from the network operator 102 for output and/or rendering, e.g., by the illustrated display devices. Although display devices are shown, a variety of other output devices are also contemplated, such as speakers. Further, although the display device is illustrated separately from the client 104, it should be readily apparent that a client may also include the display device as an integral part thereof.

The client 104 may also include personal video recorder (PVR) functionality. For instance, the client 104 is illustrated as including memory 114 to record content 112 as content 116 received via the network 108 for output to and rendering by the display device. The memory 114 may be configured in a variety of ways, such as a hard disk drive, a removable computer-readable medium (e.g., a writable or re-writeable digital video disc), and so on. Thus, content 116 that is stored in the memory 114 of the client 104 may be copies of the content 112 that was streamed from the network operator 102. Additionally, content 116 may be obtained from a variety of other sources, such as from a computer-readable medium that is accessed by the client 104, and so on. For example, content 116 may be stored on a digital video disc (DVD) when the client 104 is configured to include DVD functionality.

The illustrated client 104 includes a client communication module 118 that is representative of functionality of the client 104 to control content interaction, such as through the use of one or more "control functions". The control functions may include a variety of functions to control output of content, such as to control volume, change channels, select different inputs, configure surround sound, and so on. The control functions may also provide non-linear playback of the content 116 (i.e., time shift the playback of the content 116) such as pause, rewind, fast forward, slow motion playback, and the like. For example, during a pause, the client 104 may continue to record the content 112 received via the network 108 in memory 114 as content 116. The client 104, through execution of the client communication module 118, may then playback the content 116 from memory 114, starting at the point in time the content 116 was paused, while continuing to record the currently-broadcast content 112 in storage from the network operator 102.

When playback of the content 116 is requested, the client communication module 118 retrieves the content 116. The client communication module 118 may also restore the content 116 to the original encoded format as received from the content provider 106. For example, when the content 116 is recorded in memory 114, the content 116 may be compressed. Therefore, when the client communication module 118 retrieves the content 116, the content 116 is decompressed for rendering by the display device. In an implementation, the client communication module 118 may also provide for remote storage of content (e.g., at the network operator and/or a third-party service that is accessible via network 110), such as in a network PVR example.

The network operator 102 is illustrated as including a manager module 120. The manager module 120 is representative of functionality to configure content 112 for output (e.g., streaming) over the network 108 to the client 104. The manager module 120, for instance, may configure content 110 received from the content provider 106 to be suitable for transmission over the network 108, such as to "packetize" the content 110 for distribution over the Internet, configuration for a particular broadcast channel, and so on.

Thus, in the environment 100 of FIG. 1, the content provider 106 may provide the content 110 to a multiplicity of network operators, an example of which is illustrated as network operator 102. The network operator 102 may then stream the content 112 over a network 108 to a multitude of clients, examples of which are illustrated as client 104. Client 104, for instance, may then store the content 112 in memory 114 as content 116, such as when the client 104 is configured to include personal video recorder (PVR) functionality, remotely via the network as in the network personal video recorder (NPVR) example, and/or output the content 112 directly.

The client communication module 118 is also illustrated as including a quota manager module 122, which is representative of functionality to manage content storage using one or more quotas. For example, the quotas may specify a maximum amount of storage space that may be used to record content 116. The quotas may be specified in a variety of different ways, such as by a user through interaction with the user interface 124, automatically by the quota manager module 122 by monitoring user interaction with content 116 and/or content 112, and so on.

Functionality represented by the quota manager module 122 may be incorporated by a variety of devices. For example, the manager module 120 is also illustrated as including a quota manager module 126 (e.g., such as in a NPVR example), which may output a user interface 128. The user interface 128 may be implemented via a webpage that is accessible over the network 108 by the client 104 through the client communication module 118 when implemented as a browser. A variety of other examples are also contemplated, such as through implementation as a stand-alone service (e.g., website) that is accessible via the network 108.

Figure 2:
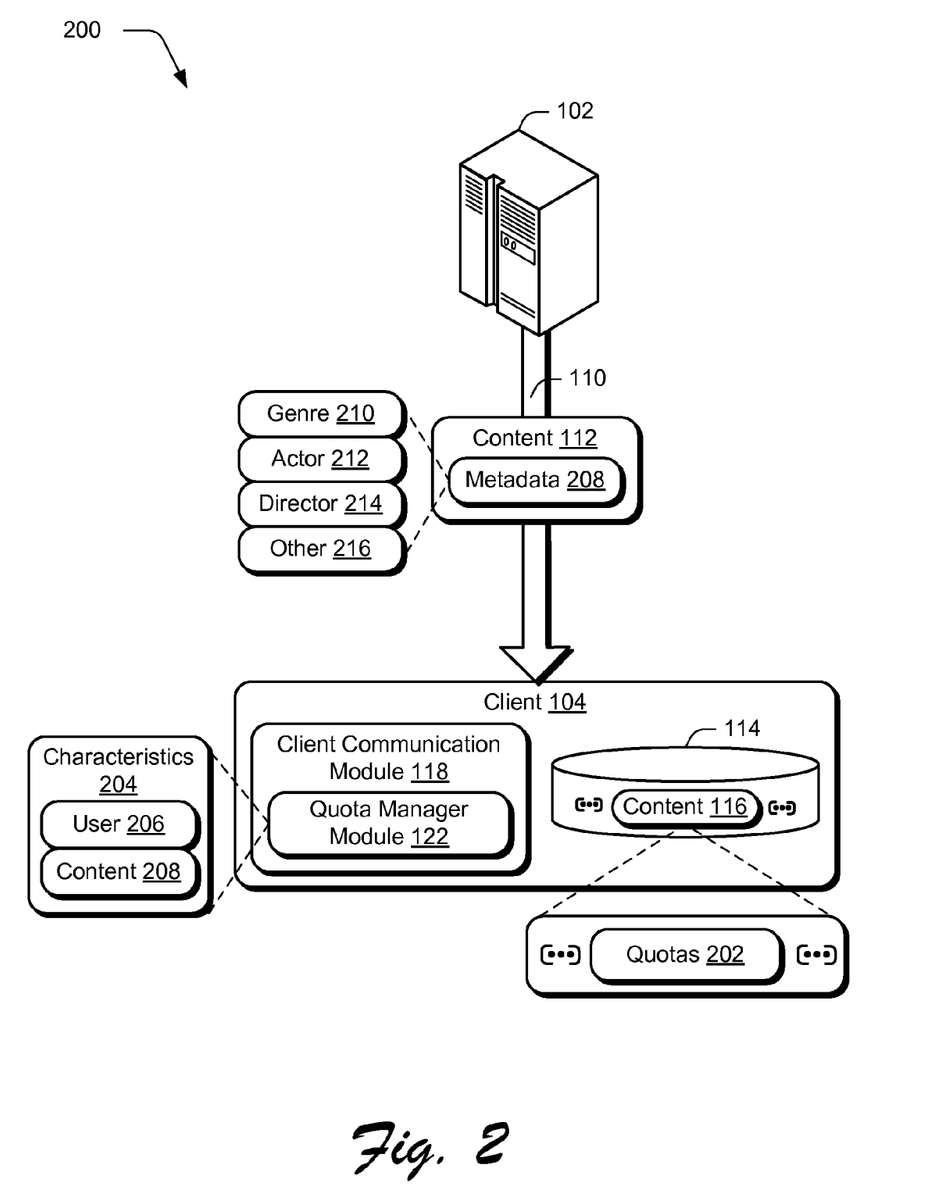
FIG. 2 is an illustration of a system in an example implementation in which quotas are illustrated as being set to manage content storage at a client of FIG. 1, which may specify a maximum amount of storage space using a variety of different characteristics.

FIG. 2 depicts a system 200 in an example implementation in which quotas 202 are illustrated as being set to manage content storage at the client 104 of FIG. 1, which may specify a maximum amount of storage space using a variety of different characteristics. The illustrated quotas 202 of FIG. 2 may be representative of one or more quotas, which may be implemented in a variety of ways. For example, quotas 202 may be implemented using partitions formed in the memory 114, files, separate storage devices available in a housing of the client 104, and so on.

The quota manager module 122 may be used to specify the quotas 202 using a variety of different characteristics 204. For example, the characteristics 204 may be specified for particular users 206 of the client 104, such as for particular members of a household, different business entities (e.g., subsidiaries of one or more corporations), employees, and so on.

In another example, the quotas 202 may be specified for particular characteristics 204 of the content 208 that is to be stored. For example, the content 112 of FIG. 2 is illustrated as being streamed over the network 110 from the network operator 102 to the client 104. The content 112 is illustrated as being associated with metadata 208 that describes the content 112. For instance, the metadata 208 may describe a genre 210 (e.g., sports) of the content 112, an actor 212, a director 214, and other 216 descriptive data, such as location, broadcast time, whether or not the content 112 is a rerun, and so on. The characteristics 204 may be set in a variety of ways, such as through interaction with the user interface, an example of which he be found in relation to the following figure.

Figure 3:
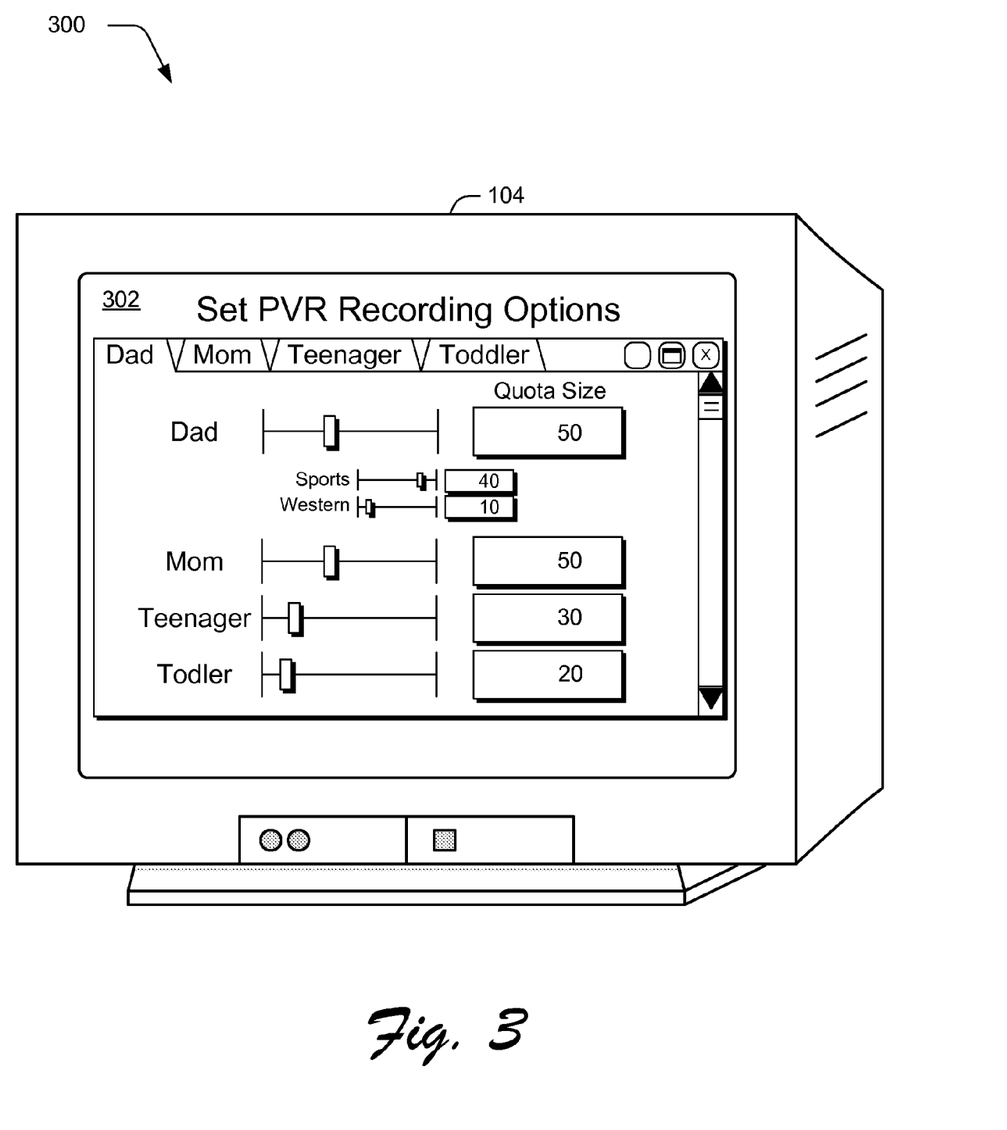
FIG. 3 is an illustration of an exemplary implementation of a user interface that is configured to set one or more quotas based on users and metadata.

FIG. 3 illustrates an exemplary implementation 300 of a user interface 302 that is configured to set one or more quotas based on users and metadata. The user interface 302 includes a plurality of tabs that correspond to users in a particular household, the illustrated examples including "Dad", "Mom", "Teenager", and "Toddler". Each of the tabs are selectable to specify television programs that are to be recorded by the client 104 configured as a personal video recorder (PVR).

In the illustrated user interface 302, the Dad tab is selected to specify quotas for each of the users in a household. The quotas may be specified in a variety of ways, the illustrated examples of FIG. 3 including sliders and text entry portions. In an implementation, the setting of the quotas may be limited to one or more particular users of the household, such as the Dad and Mom in illustrated example. Thus, a variety of ways may be used to specify a maximum amount of storage space that is permitted to be used by each of the users to store content on the PVR.

Quotas may also be specified for a variety of other characteristics, such as metadata associated with the content as previously described. For example, the user interface 302 is also illustrated as including sliders and text entry portions that may be used to specify "sub-quotas" for genres for the user quota "Dad". Thus, in this example the quota size "50" for the user "Dad" may also be subdivided using one or more other quotas, examples of which are based on metadata, e.g., genre. A variety of different techniques may be used by the quota manager module 122, further discussion of which may be found in relation to the following procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the techniques to use quotas to manage content storage are platform-independent, meaning that the techniques may be implemented on a variety of commercial computing platforms having a variety of processors.

Example Procedures

The following discussion describes quota techniques that may be implemented utilizing the previously described environment, systems, user interfaces and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100, system 200, and embodiment 300 of FIGS. 1-3, respectively.

Figure 4:
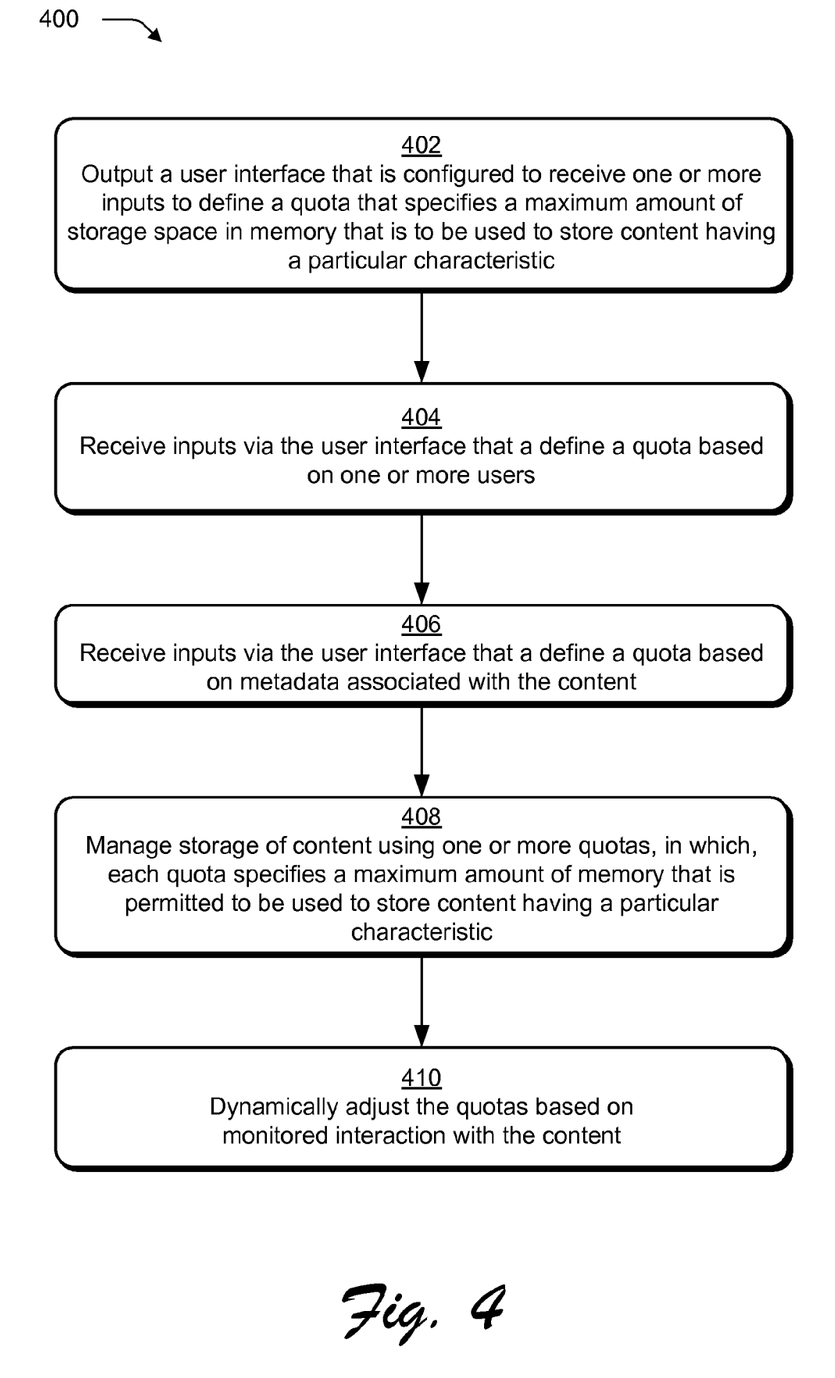
FIG. 4 depicts a flowchart describing a procedure in an example implementation in which one or more inputs are received via a user interface to set one or more quotas, which are dynamically adjusted based on monitored interaction with the content.

FIG. 4 depicts a procedure 400 in an example implementation in which one or more inputs are received reset a user interface to set one or more quotas, which are dynamically adjusted based on monitored interaction with the content. A user interface is output that is configured to receive one or more inputs to define a quota that specifies a maximum amount of storage space in memory that is to be used to store content having a particular characteristic (block 402).

For example, inputs may be received via the user interface that define a quota based on one or more users (block 404). A user, for instance, may interact with the user interface 302 of FIG. 3 to specify one or more quotas that pertain to a user that is to be associated with content storage. The user, for instance, may specify content to be recorded manually (e.g., by selecting particular television programs), automatically (e.g., based on monitored interaction of the user with content, such as to automatically record music of a particular artist), and so on. Thus, content that is to be associated with a particular user may be recorded automatically or manually without departing from the spirit and scope thereof.

In another example, inputs are received via the user interface that define a quota based on metadata associated with the content (block 406). The metadata 224, for instance, may be streamed with content 112 over the network 108 to the client 104. The metadata 224 may describe a variety of different characteristics of the content 114 as previously described, such as a sports genre. Further, as previously described these different quotas may be combined to form a hierarchical arrangement in which quotas may be nested, one within another.

Storage of the content is managed using one or more quotas, in which, each quota specifies a maximum amount of memory that is permitted to be used to store content having a particular characteristic (block 408). For example, the quota manager module 224 may manage storage of content using the quotas specified by a user via interaction with the user interface as previously described. Quotas may also be dynamically adjusted based on monitored interaction with the content (block 410). For example, the quota manager module 224 may monitor user interaction with particular content and note the metadata (e.g., characteristics of the metadata) is associated with the content. The metadata may then be used to describe likes and/or dislikes of the user, which may then be used to dynamically adjust quotas and/or sub-quotas for the user.

For instance, a user may be assigned a quota for a PVR by another user. The user having the assigned quota, however, may specify additional quotas for content that is to be stored for the user, such as for particular genres as previously described in relation to FIG. 3. These additional quotas may then be dynamically adjusted by the quota manager module 224, such as in response to selection of this feature by the user. For example, the quota manager module 224 may determine which recorded programs are actually watched by the user and adjust the quotas (e.g., genre as in FIG. 3) accordingly. A variety of other examples of dynamic content storage management based on monitored user interaction are also contemplated, such as to correspond to characteristics 220 that may be specified for the quotas 202. A variety of other techniques may also be used to manage content storage using quotas, further discussion of which be found in relation to the following figure.

Figure 5:
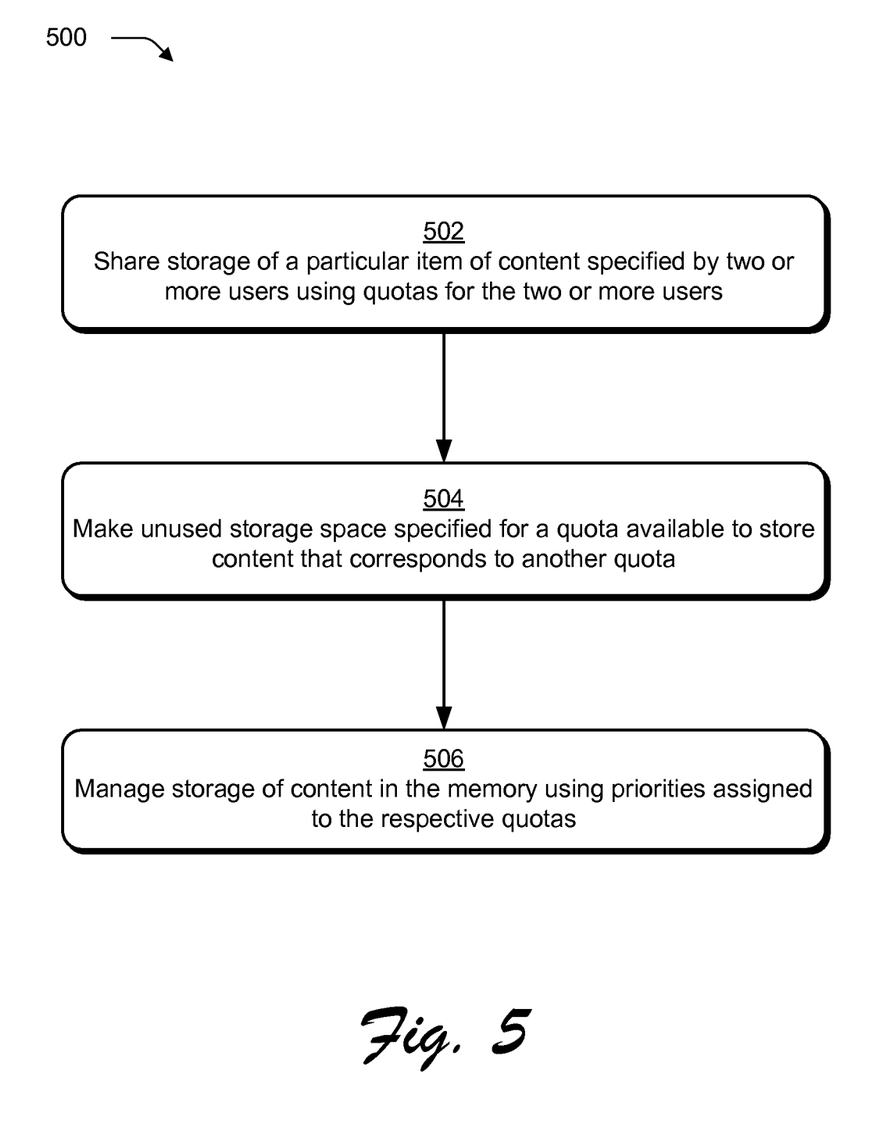
FIG. 5 depicts a flowchart describing a procedure in an example implementation in which content storage is managed using quotas.

FIG. 5 depicts a procedure 500 in an example implementation in which content storage is managed using quotas. As previously described, a variety of different techniques may be used to specify quotas. Additionally, a variety of techniques may also be utilized to manage content storage as specified by the quotas, such as to manage conflicts, manage storage of content across multiple quotas, and so on.

For example, storage of a particular item of content specified by two or more users is shared using quotas for the two or more users (block 502). For example, the two or more users, and more particularly the quotas of the two or more users, may be specified such that each user is assigned a maximum amount of storage space. Therefore, when two or more users specify that a matching item of content (e.g., a particular song, television program, and so on) is to be recorded, storage of that particular item may be allocated "across" the quotas of those users.

In another example, unused storage space that is specified for a quota may be made available to store content that corresponds to another quota (block 504). For instance, a user that is allocated a particular quota may not use a significant portion of the quota. In such an instance, the quota manager module 224 may make this unused storage space available for other quotas, such as for another user, to record content in another genre, and so on.

In a further example, storage of content in the memory is managed using priorities assigned to the respective quotas (block 506). For instance, two or more users may encounter a conflict to record respective content, such as content that is to be broadcast at the same time via different channels. In this instance, the quota manager module 224 may determine which television program is to be recorded based on priorities assigned to the user, metadata (e.g., sports content is to "win" over news content), and so on. Although some examples have been described that involved management of content according to specified priorities, a wide variety of other techniques may also be utilized without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A personal video recorder comprising:
    memory to store television programming streamed via a network connection from a network operator;
    one or more modules configured to output a user interface configured to support user interaction to manage storage of the television programming using quotas, a first said quota specifying a maximum amount of the memory that is permitted to be used to store the television programming for a first said user and a second said quota specifying a maximum amount of the memory that is permitted to be used to store the television programming for a second said user; and
    one or more devices configured to output the television programming.

2. A personal video recorder as described in claim 1, wherein the one or more modules are configured to manage storage of the television programming using a plurality of said quotas for a plurality of corresponding said users.

3. A personal video recorder as described in claim 2, wherein the one or more modules are configured to manage storage of the television programming using one or more sub-quotas for the plurality of corresponding said users, wherein the sub-quotas are based at least in part on a maximum amount of the memory that is permitted to be used by the corresponding said user to store the television programming having a particular genre.

4. A personal video recorder as described in claim 1, wherein the one or more modules are configured to manage storage of the television programming using another said quota that specified a maximum amount of the memory that is permitted to be used to store the television programming having a particular genre.

5. A personal video recorder as described in claim 1, wherein the one or more modules are configured to manage storage of the television programming using another said quota that specified a maximum amount of storage space in memory that is to be used to store television programming having a particular characteristic.

6. A personal video recorder as described in claim 1, wherein the one or more modules are configured to manage storage of the television programming by dynamically adjusting at least one of the quotas based on monitored interaction with the television programming.

7. A personal video recorder as described in claim 1, wherein the one or more modules are configured to manage storage of the television programming by making unused storage space in the memory that is specified for a particular said quota to store television programming that corresponds to another said quota.

8. A personal video recorder as described in claim 1, wherein the one or more modules are configured to manage storage of the television programming by sharing storage of a particular time of television programming specified by the first and second said users using respective said quotas for the first and second said users.

9. A personal video recorder as described in claim 1, wherein the managing is performed when storage space to record the television programming is approximately full.

10. A personal video recorder as described in claim 1 wherein the memory is a single hard disk drive.

11. A personal video recorder as described in claim 1, wherein the personal video recorder is a client device and the network operator is a server device.

12. An apparatus comprising:
    memory to store content streamed via a network connection from a network operator;
    one or more modules to manage storage of the content using one or more quotas, at least one said quota specifies a maximum amount of the memory that is permitted to be used to store the content having a particular genre; and
    one or more additional modules configured to output the content.

13. An apparatus as described in claim 12, wherein the particular genre is sports.

14. An apparatus as described in claim 12, wherein the one or more modules are configured to manage storage of the content by dynamically adjusting at least one of the quotas based on monitored interaction with the content.

15. An apparatus as described in claim 12, wherein another said quota specifies a maximum amount of the memory that is permitted to be used to store the content for a corresponding user.

16. A apparatus as described in claim 15, wherein the at least one quota comprises a sub-quota of the another quota, such that the corresponding user has a maximum amount of the memory to store the content having a particular genre that is less than the maximum amount of the memory to store the content for the corresponding user.

17. A method comprising:
    outputting a user interface, by a personal video recorder, that is configured to receive one or more inputs to define a quota that specifies a maximum amount of storage space in memory that is to be used to store television programming having a particular characteristic, the television programming streamed to the personal video recorder via a network connection from a network operator;
    managing storage of the television programming by the personal video recorder using the quota; and
    causing display of the television programming from the personal video recorder.

18. A method as described in claim 17, wherein:
    the particular characteristic is selectable in the user interface from a plurality of choices; and
    each said choice corresponds to metadata of the television programming.

19. A method as described in claim 17, wherein the particular characteristic references a user that specified that the television programming is to be stored.

20. A method as described in claim 17, wherein the particular characteristic is a genre of the television programming.

* * * * *